(12) United States Patent
Liao et al.

(10) Patent No.: US 12,423,046 B2
(45) Date of Patent: *Sep. 23, 2025

(54) SECONDARY DISPLAY LOCATION DETERMINATIONS

(71) Applicant: Microsoft Technology Licensing, LLC, Redmond, WA (US)

(72) Inventors: Gary De-Hong Liao, Bellevue, WA (US); Yilin Song, Redmond, WA (US); Michael Paul Erich Von Hippel, Seattle, WA (US); Nina Emi Rothenhaus, San Diego, CA (US); Sankalp Gupta, Kirkland, WA (US); Tomas Edward Morris, Redmond, WA (US); John Christopher Whytock, Portland, OR (US); Hanna Landauer McLaughlin, Seattle, WA (US); Lee Dicks Clark, Decatur, GA (US); Fernando Evelio Alvarez, Redmond, WA (US); Albert Peter Yih, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,841

(22) Filed: Apr. 9, 2024

(65) Prior Publication Data
US 2024/0256208 A1 Aug. 1, 2024

Related U.S. Application Data

(63) Continuation of application No. 17/865,069, filed on Jul. 14, 2022, now Pat. No. 11,989,480.

(51) Int. Cl.
*G06F 3/14* (2006.01)
*G06F 3/04817* (2022.01)
*G06F 3/04842* (2022.01)

(52) U.S. Cl.
CPC ........ *G06F 3/1446* (2013.01); *G06F 3/04817* (2013.01); *G06F 3/04842* (2013.01)

(58) Field of Classification Search
CPC . G06F 3/1446; G06F 3/04817; G06F 3/04842
See application file for complete search history.

(56) References Cited

U.S. PATENT DOCUMENTS

2016/0162243 A1* 6/2016 Neisler ................ G06F 3/1446
　　　　　　　　　　　　　　　　　　　　345/163
2019/0377472 A1* 12/2019 Naylor ................ G06F 3/04842

\* cited by examiner

*Primary Examiner* — Cao H Nguyen

(57) ABSTRACT

According to examples, an apparatus may include a processor that may, responsive to a determination that a secondary display is connected to the apparatus, cause a primary display of the apparatus to display a window including an option to be selected to proceed with a location detection operation of the secondary display. The processor may also cause an icon to be displayed on the secondary display, track a movement of a cursor from the primary display to the icon displayed on the secondary display, and determine a position of the secondary display with respect to the primary display based on the tracked movement of the cursor. The processor may further store the determined position of the secondary display with respect to the primary display.

20 Claims, 7 Drawing Sheets

SECONDARY DISPLAY LOCATION DETERMINATIONS

RELATED APPLICATIONS

This application is a Continuation of co-pending U.S. patent application Ser. No. 17/865,069, filed Jul. 14, 2022, which is a parent of International Patent Application No. PCT/US23/24637, filed Jun. 7, 2023, the disclosures of which are hereby incorporated by reference in their entireties.

BACKGROUND

Many users of computing devices, such as desktop and laptop computers, often connect multiple displays to the computing devices. The users may be able to view multiple windows and documents concurrently on the multiple displays. As a result, users may experience greater productivity through use of the multiple displays. Users may often perform manual configuration operations in which the users provide the computing devices with the locations of any secondary displays that are connected to the computing devices.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
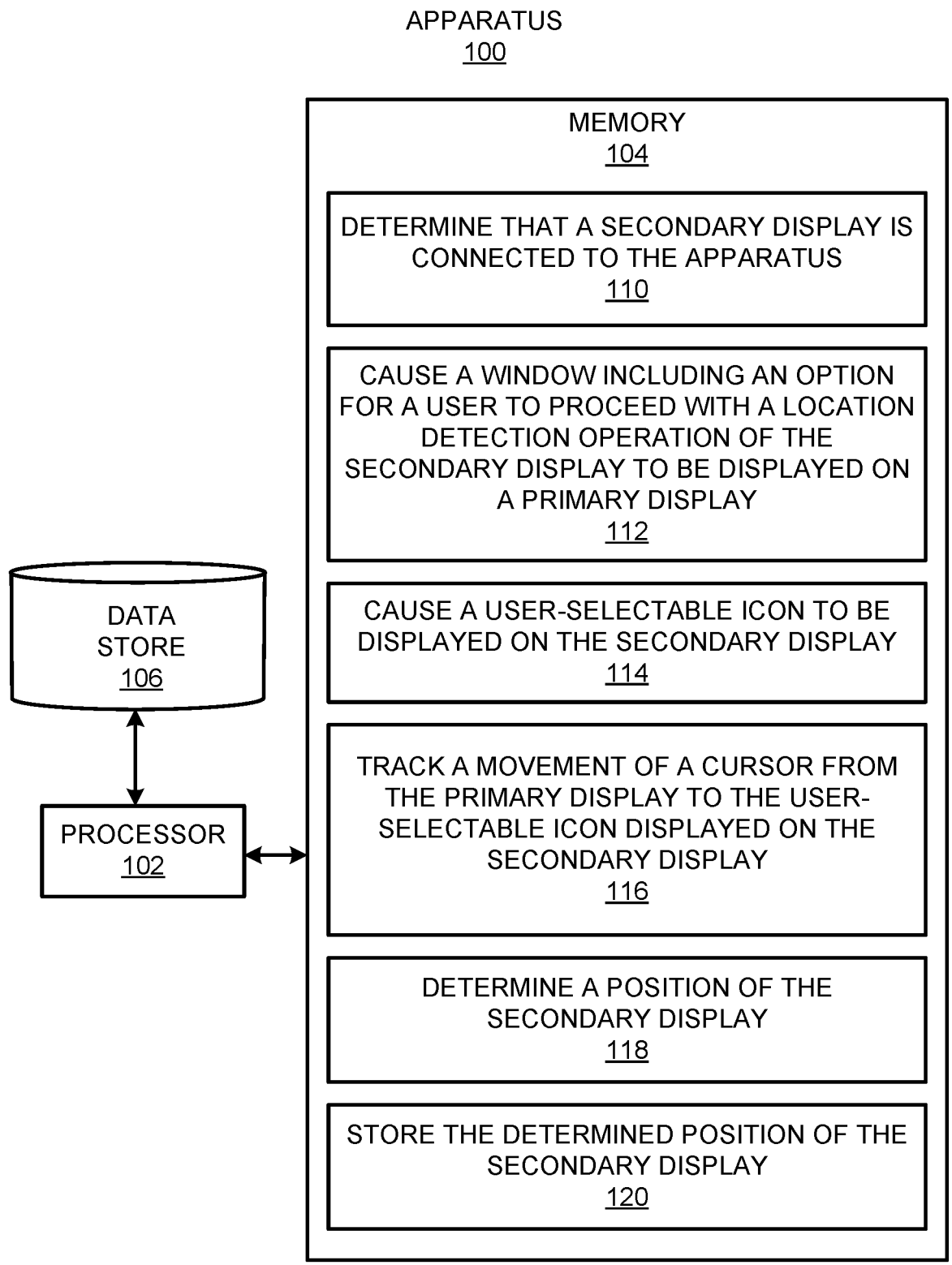
FIGS. 1 and 2, respectively, show block diagrams of an apparatus that includes a processor that may implement a secondary display location detection operation, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on. In the addition, the use of the terms "primary," "secondary," "tertiary," "first," "second," "third," etc., are not intended to denote a specific order or importance of elements, but instead are intended to distinguish the elements with respect to each other.

Users of computing devices may execute a configuration process when new displays are connected to the computing devices. The configuration process may include the display of a window that includes a representation of a display that is currently connected to a computing device and a representation of a newly detected display. A user may move the representation of the newly detected display with respect to the representation of the currently connected display. Particularly, the user may, using a mouse, select the representation of the newly detected display, for instance, by "clicking" on that representation. The user may then move that representation to a location in the window that the user believes approximately corresponds to the location of the newly detected display with respect to the currently connected display. The computing device may use the positions of the representations in extending the display of images between the currently connected display and the newly detected display.

In many instances, as the users are guessing at the position of the secondary display with respect to the primary display, the users may not accurately position representations of newly detected displays with respect to representations of currently connected displays. The users may not determine that the positioning of the representations are inaccurate until the users begin using the newly detected displays. As a result, the users may be required to initiate the configuration process again to correct the positions of the representations of the currently connected displays. In many instances, users may be unaware that they have the ability to reposition the displays and may simply use the displays in their existing positions, which may result in a less than ideal user experience with the displays. Technical issues associated with the configuration of newly added displays may thus be that they may be prone to errors and require multiple attempts. This may increase the amount of time required, processing resources used, and energy used in setting up additional displays.

Disclosed herein are apparatuses, methods, and computer-readable mediums that may enable the locations of external displays with respect to previously connected primary displays to be determined in accurate and efficient manners. Particularly, a processor may cause an icon to be displayed at a certain display location on a newly discovered display, e.g., a secondary display, a tertiary display, and may track a movement of a cursor from the primary display to the icon. That is, the processor may track a movement of a cursor by a user from a position on the primary display to the icon displayed on the newly discovered display and the processor may determine when the cursor is over the icon and/or when a user has clicked on or otherwise selected the icon. The tracked movement may be a horizontal distance, a vertical distance, and/or an angle of movement of the cursor. The processor may use the tracked movement of the cursor to determine the position of the certain display location of the secondary display with respect to the primary display. In addition, the processor may use the determined certain display location to determine the location of the secondary display with respect to the primary display.

The features of the present disclosure may be extended to other secondary displays, e.g., a tertiary display, a quaternary display. In these instances, the processor may cause an icon to be displayed at a certain display location on at least one of the secondary displays. In addition, the processor may track a movement of a cursor from the primary display and/or the secondary display to the icon(s) displayed on the other secondary display(s). The processor may also determine the location(s) of the other secondary display(s) with respect to the primary display and/or the secondary display based on the tracked movement.

Through implementation of features of the present disclosure, a processor of an apparatus may accurately and efficiently determine the location of at least one secondary display with respect to a primary display. The determination of the at least one secondary display location may relatively be more accurate than other location determination techniques because the processor may determine the certain display location(s) of the secondary display through tracking of a mouse movement to the icon(s) displayed at the certain display location(s). Technical improvements afforded through implementation of the features of the present disclosure may include accurate and efficient set up of at least one secondary display. That is, the features of the present disclosure may enable the efficient determinations of secondary display locations because the features enable the secondary display locations to be determined accurately at an initial time that a location operation is performed. This may reduce or optimize the amount of time, processing resources, and energy consumed in determining the locations of the secondary displays with respect to primary displays. The features of the present disclosure may also improve human-computer interactions in setting up secondary displays.

Figure 2:
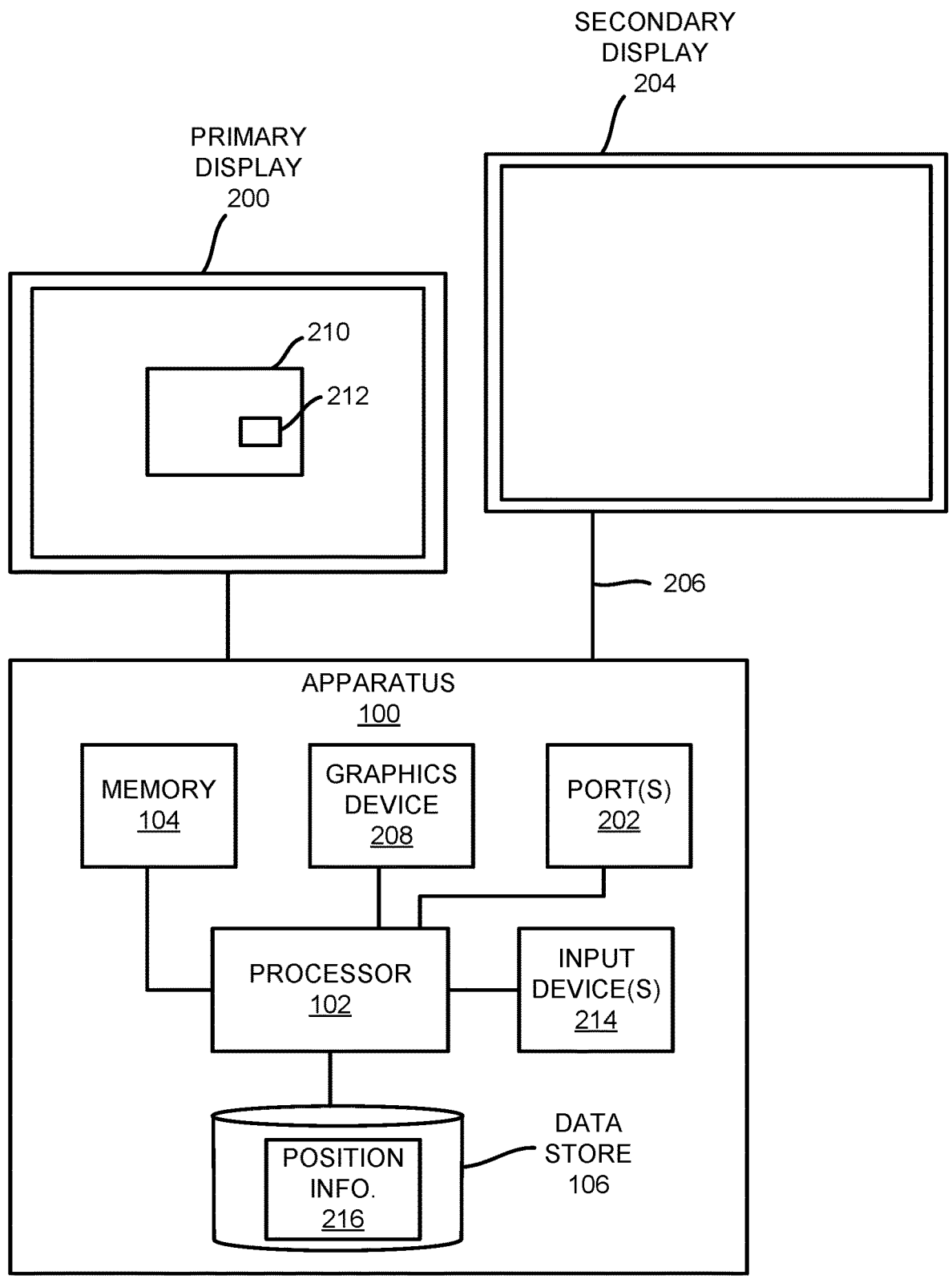

Reference is first made to FIGS. 1 and 2, which respectively show block diagrams of an apparatus 100 that may include a processor 102 that may implement a secondary display location detection operation, in accordance with an embodiment of the present disclosure. It should be understood that the apparatus 100 depicted in FIGS. 1 and 2 may include additional features and that some of the features described herein may be removed and/or modified without departing from the scope of the apparatus 100.

As shown in FIGS. 1 and 2, the apparatus 100 may include a processor 102 that may control operations of the apparatus 100. It should be understood that references made herein to the apparatus 100 performing various operations should equivalently be construed as meaning that the processor 102 of the apparatus 100 may perform those various operations. The apparatus 100 may also include a memory 104 on which instructions that the processor 102 may access and/or may execute may be stored. In addition, the processor 102 may include a data store 106 on which the processor 102 may store and access various information as discussed herein. The processor 102 may be a semiconductor-based microprocessor, a central processing unit (CPU), an application specific integrated circuit (ASIC), a field-programmable gate array (FPGA), and/or other hardware device.

Although the apparatus 100 is depicted as having a single processor 102, it should be understood that the apparatus 100 may include additional processors and/or cores without departing from a scope of the apparatus 100. In this regard, references to a single processor 102 as well as to a single memory 104 may be understood to additionally or alternatively pertain to multiple processors 102 and/or multiple memories 104. In addition, or alternatively, the processor 102 and the memory 104 may be integrated into a single component, e.g., an integrated circuit on which both the processor 102 and the memory 104 may be provided.

The memory 104 and the data store 106, which may also each be termed a computer readable medium, may each be a Random Access memory (RAM), an Electrically Erasable Programmable Read-Only Memory (EEPROM), a storage device, or the like. The memory 104 and/or the data store 106 may be a non-transitory computer readable storage medium, where the term "non-transitory" does not encompass transitory propagating signals.

Generally speaking, the apparatus 100 may be a computing device such as a laptop computer, a desktop computer, a tablet computer, a smartphone, and/or the like. As shown in FIG. 2, a primary display 200 (which may also be referenced herein as a first display 200) may be connected to the apparatus 100. The primary display 200 may be any suitable type of display, such as a liquid crystal display (LCD) display, a light emitting diode (LED) display, an organic LED display, a plasma display, and/or the like. In examples in which the apparatus 100 is a laptop computer, a tablet computer, or a smartphone, the primary display 200 may form part of the apparatus 100. For instance, the primary display 200 may be integrated with the apparatus 100 such that the primary display 200 and the apparatus 100 share a common housing or a housing of the primary display 200 is connected to a housing of the apparatus via a fixed or movable connection.

In examples in which the apparatus 100 is a desktop computer or other type of computing device that may not have an integrated display or that may have multiple displays, the primary display 200 may be connected to a port 202 of the apparatus 100 through a cable. Particularly, for instance, the port 202 may be a high-definition multimedia interface (HDMI) port, a DisplayPort, a universal serial bus (USB) port, a VGA port, a DVI port, and/or the like. In addition, the cable connecting the primary display 200 to the apparatus 100 may be a corresponding type of cable.

In some examples in which multiple displays are connected to the apparatus 100, the primary display 200 may be a display that was previously connected to the apparatus 100. In other words, the processor 102 may have previously detected the primary display 200 and may have determined a position of the primary display 200 with respect to another display (not shown), e.g., a third or tertiary display. For instance, the primary display 200 may be a display that is integrated with a laptop computer or a tablet computer. In other examples, the primary display 200 may be a display that is connected to a desktop computer, a laptop computer, a tablet computer, etc.

As also shown in FIG. 2, a secondary display 204 (which may also referenced herein as a second display 204) may also be connected to the apparatus 100 via a cable 206 and a port 202 in the apparatus 100. The cable 206 may be connected to a different port 202 in the apparatus 100 than the primary display 200. In other examples, the secondary display 204 may be connected to the apparatus 100 indirectly, e.g., via a docking station, a hub, a wireless connection, via another apparatus (such as another computing device). By way of particular example, a computing device, or an electronic device, such as a television, may include or be connected to a display and the secondary display 204 may be that display. In this example, the computing device or electronic device may broadcast an ability for another computing device to take over the usage of the display to which the computing device or electronic device is connected. In addition, the processor 102 may take over the usage of that display from the computing device or electronic device.

The secondary display 204 may be any suitable type of display, such as a LCD display, a LED display, an OLED display, a plasma display, and/or the like. The terms "primary display" and "secondary display" are not intended to denote that one display is used as a main display over the other display. Instead, the "primary display" may be distinguished from the "secondary display" in that the processor 102 may have caused images to be displayed on the primary display 200 prior to the use of the secondary display 204 to display images. Likewise, the processor 102 may have sent images to be displayed on the primary display 200 prior to the secondary display 204 being connected to the apparatus 100.

In some examples, the processor 102 may receive information about the secondary display 204 from the secondary display 204 through the connection with the secondary display 204. The information about the secondary display 204 may include the resolution of the secondary display 204, the physical dimensions of the display size of the secondary display 204, and/or the like. The processor 102 may use this information to determine a certain display location of the secondary display 204.

The processor 102 may cause images to be displayed on the primary display 200 and the secondary display 204 through use of a graphics device 208. The graphics device 208 may be a graphics card, an integrated graphics chip, a graphics processing unit, and/or the like. Generally speaking, the processor 102 may communicate information about images to be displayed on the primary display 200 and the secondary display 204 to the graphics device 208. The graphics device 208 may determine how to use pixels in the primary display 200 and the secondary display 204 and may send that information to the primary display 200 and the secondary display 204 through respective connections. In addition, images corresponding to the information may be displayed on the primary display 200 and the secondary display 204.

Figure 3A:
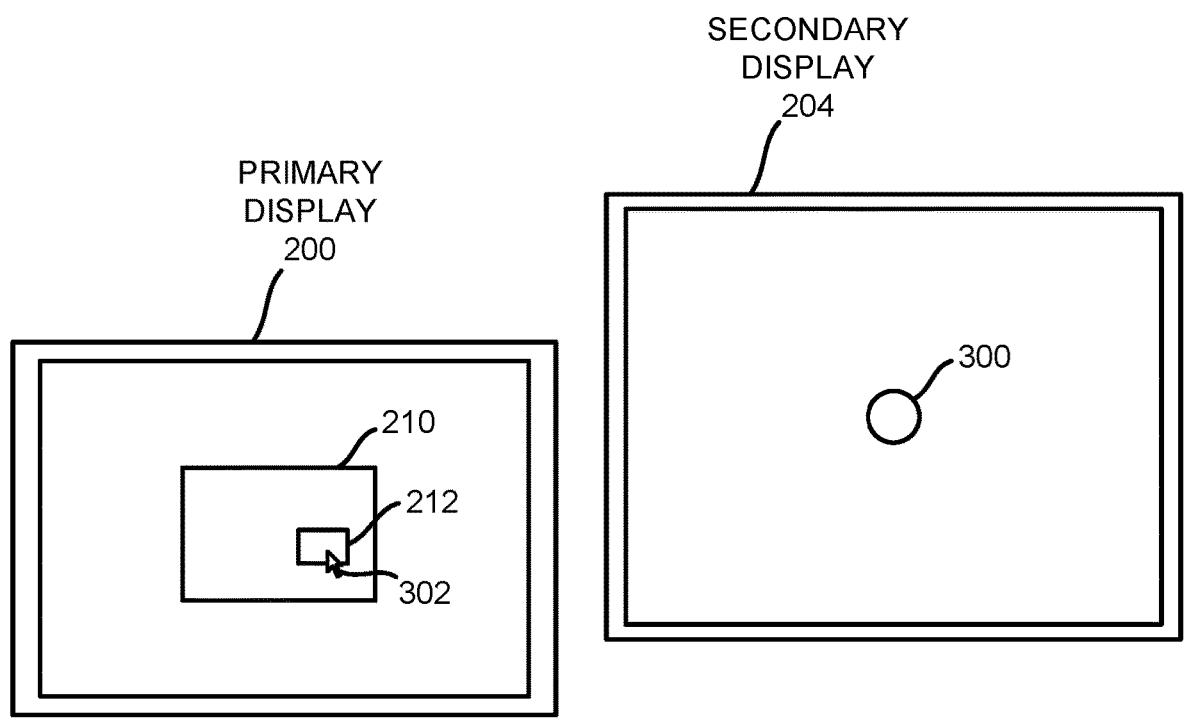
FIGS. 3A-3E, respectively, depict diagrams of a primary display and a secondary display during various stages of the secondary display location detection operation, in accordance with an embodiment of the present disclosure.
Figure 3B:
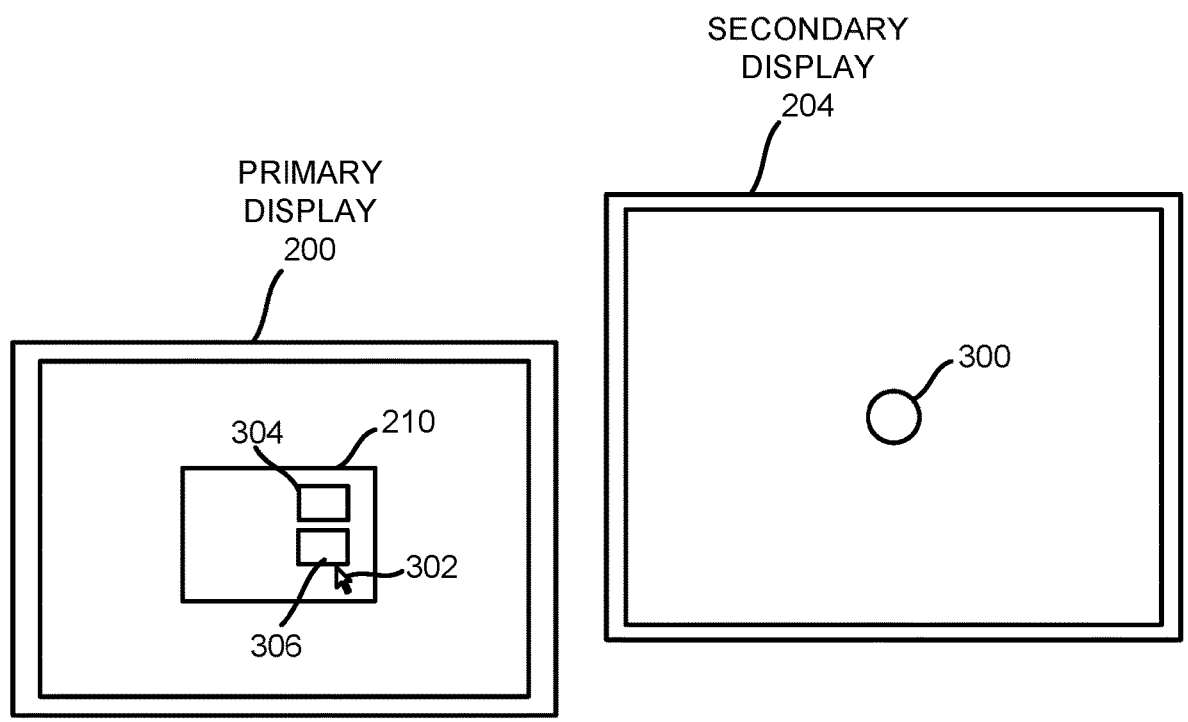
Figure 3C:
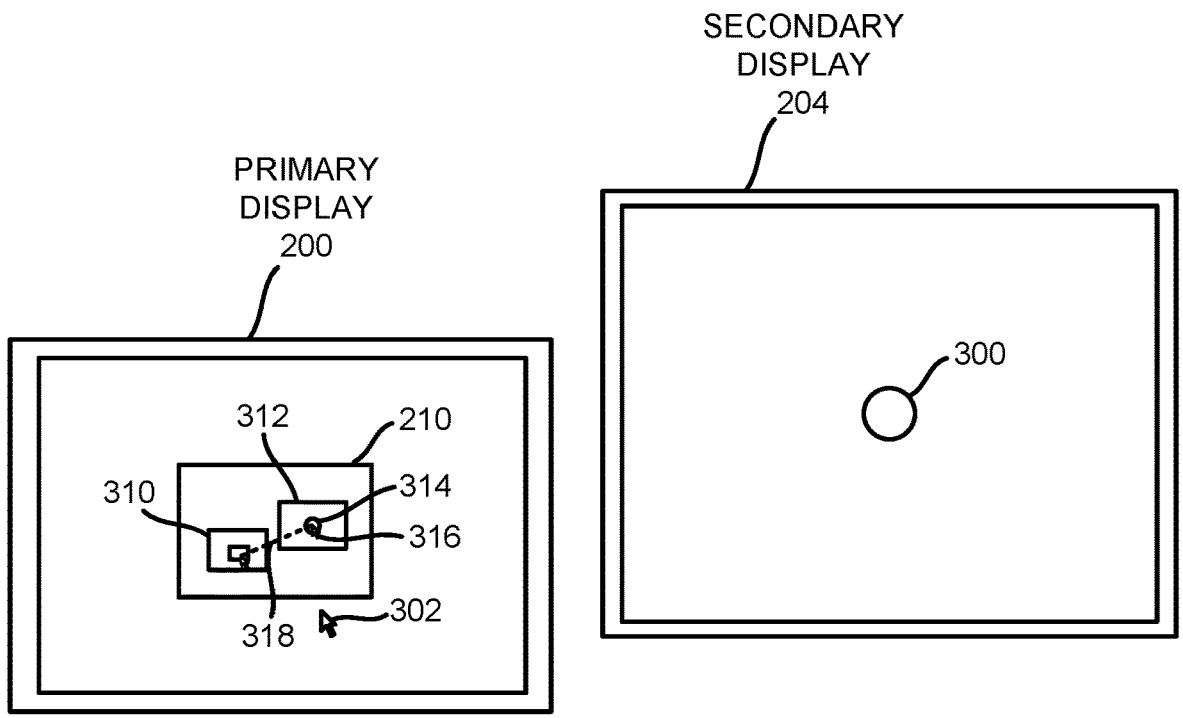
Figure 3D:
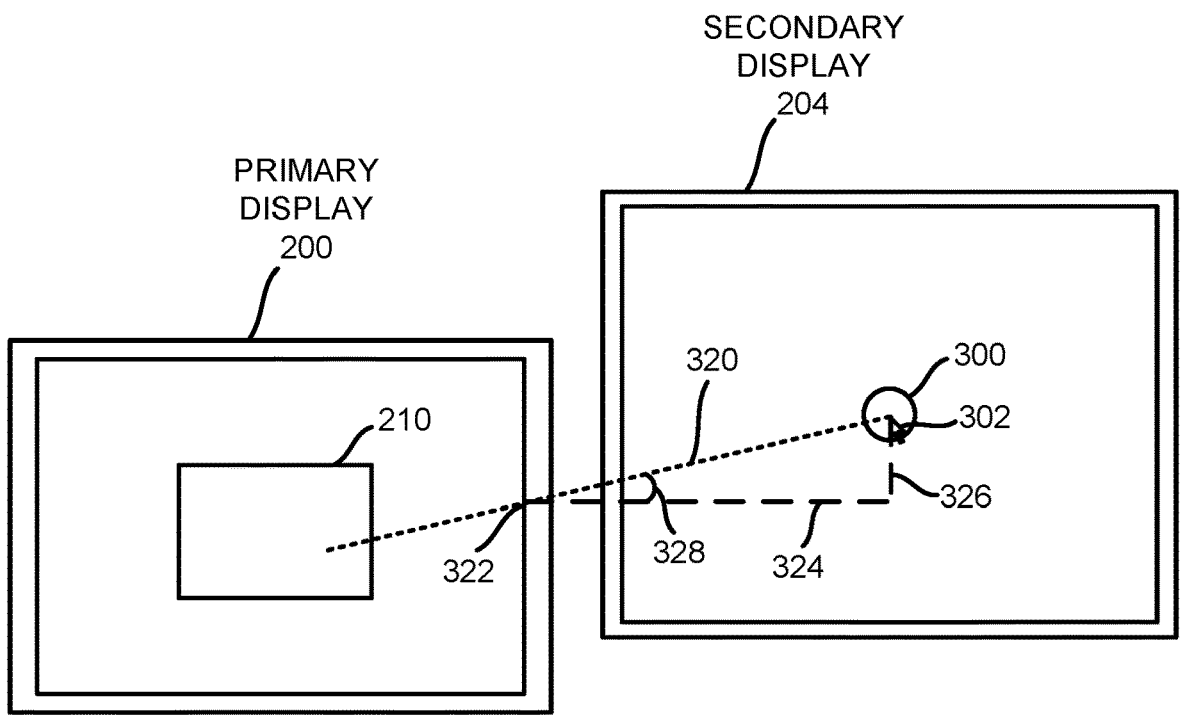
Figure 3E:
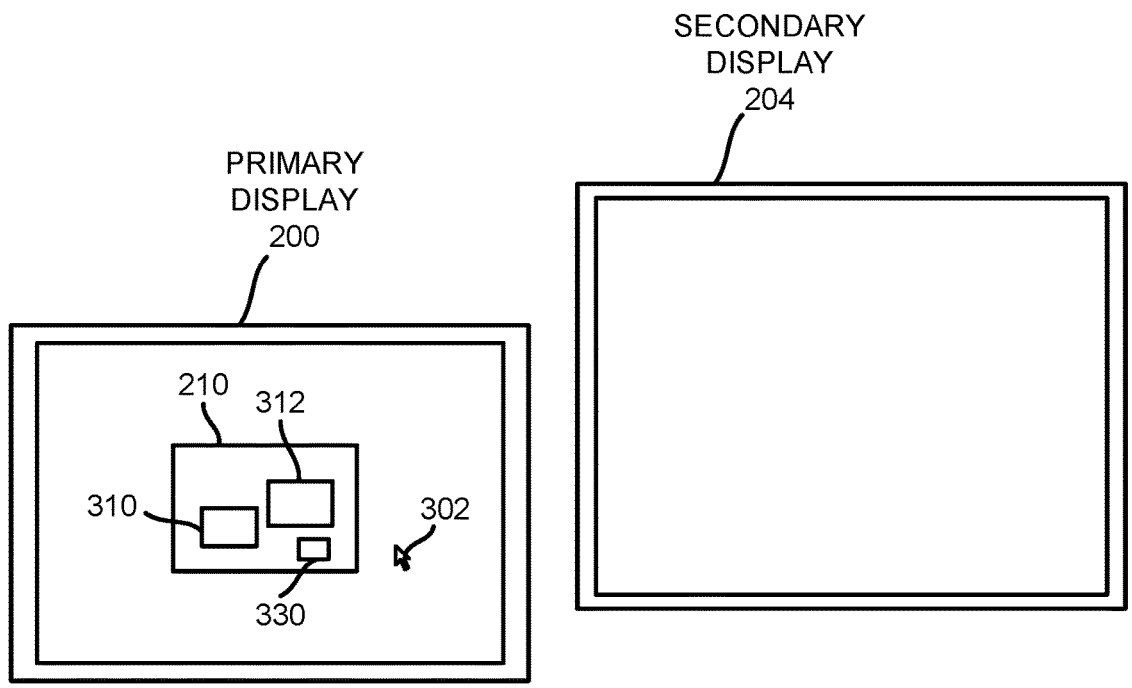
Figure 3F:
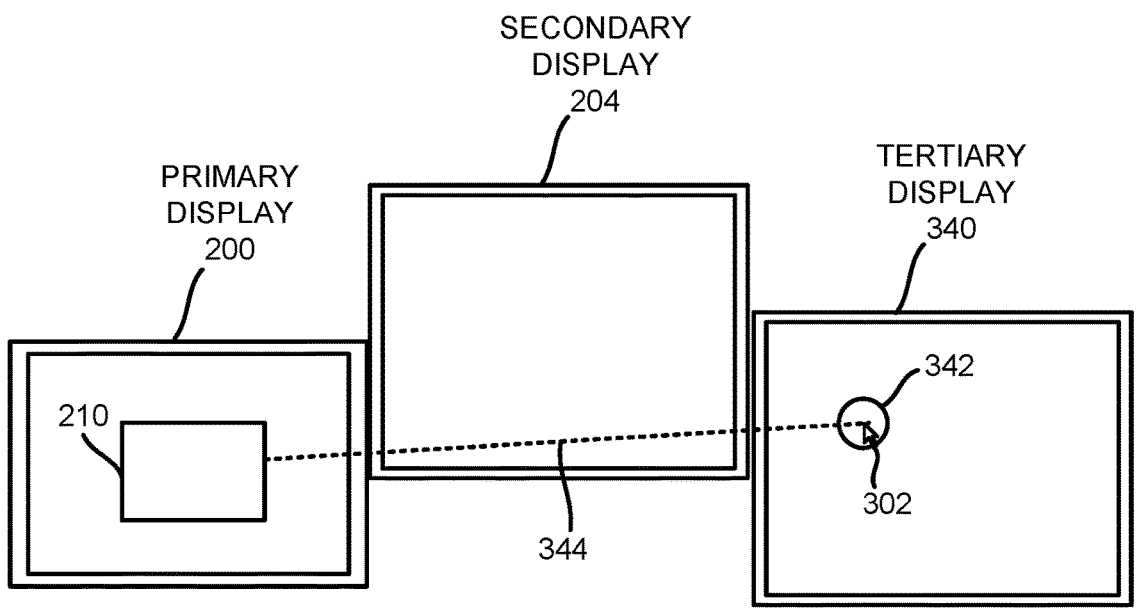
FIG. 3F depicts a diagram of a primary display, a secondary display, and a tertiary display, in accordance with an embodiment of the present disclosure.

Various operations performed by the processor 102 to cause certain images to be displayed on the primary display 200 and the secondary display 204 are described with respect to FIGS. 1, 2, and 3A-3F. FIGS. 3A-3E, respectively, depict diagrams of the primary display 200 and the secondary display 204 during various stages of the location detection operation of the secondary display 204, in accordance with an embodiment of the present disclosure. FIG. 3F depicts a diagram of a primary display 200, a secondary display 204, and a tertiary display 340, in accordance with an embodiment of the present disclosure. It should be understood that the features of the primary display 200 and the secondary display 204 depicted in FIGS. 3A-3F are for purposes of illustration and should thus not be construed as limiting the present disclosure in any respect. Additionally, it should be understood that the positioning of the secondary display 204 with respect to the primary display 200 in FIGS. 2-3F are for purposes of illustration and should thus not be construed as limiting the present disclosure in any respect. For instance, the secondary display 204 may be positioned to the left, above, below, etc., the primary display 200.

With particular reference to FIGS. 1 and 2, the memory 104 may have stored thereon machine-readable instructions 110-120 that the processor 102 may execute. The processor 102 may execute the instructions 110 to determine that a secondary display 204 is connected to the apparatus 100. The processor 102 may make this determination when a cable 206 is connected to both the apparatus 100 and the secondary display 204. For instance, the processor 102 may determine that the secondary display 204 has been connected to the apparatus 100 as part of a "plug and play" operation of the secondary display 204.

In some examples, the processor 102 may determine whether the secondary display 204 was previously connected to the apparatus 100 or whether the present connection is a first time that the secondary display 204 has been connected to the secondary display 204. The processor 102 may determine that the secondary display 204 was not previously connected to the apparatus 100, e.g., is a first run of the connection of the secondary display 204 to the apparatus 100, based on a determination that the processor 102 does not have information about the secondary display 204 stored in the data store 106.

Based on a determination that the secondary display 204 is not a previously known display, the processor 102 may execute a first run experience operation for the secondary display 204. The first run experience operation may be an operation that assists users in setting up the secondary display 204. For instance, the first run experience operation may include a location detection operation of the secondary display 204 that may enable the processor 102 to determine the location of the secondary display 204 with respect to the location of the primary display 200 in a relatively simple and efficient manner.

The processor 102 may execute the instructions 112 to, responsive to the secondary display 204 being detected, cause a window 210 including an option 212 for a user to proceed with a location detection operation of the secondary display 204 to be displayed on the primary display 200. In some examples, the processor 102 may cause the window 210 including the option 212 to be displayed on the primary display 200 in response to a determination that the secondary display 204 is connected to the apparatus 100 for a first time. In these examples, the processor 102 may not cause the window 210 to be displayed on the primary display 200 in response to a determination that the secondary display 204 was previously connected to the apparatus 100.

An example of the window 210 and the option 212 are depicted in FIG. 2. The window 210 may be a pop-up window that the processor 102 may instruct the graphics device 208 to display on the primary display 200. In addition, the processor 102 may instruct the graphics device 208 to display the option 212 within the window 210 as, for instance, a button that the user may select. The window 210 may also include an option for discontinuing the location detection operation of the secondary display 204. Based on a determination that the option for discontinuing the location detection operation of the secondary display 204 has been selected, the processor 102 may cancel the location detection operation. This may cause the secondary display 204 to be used to mirror the images displayed on the primary display 200.

However, based on a determination that the option 212 for proceeding with the location detection operation of the secondary display 204 has been selected, the processor 102 may execute the instructions 114 to cause an icon 300 to be displayed on the secondary display 204. An example of the icon 300 is depicted in FIG. 3A. According to examples, the icon 300 may be positioned at a certain display location of the secondary display 204. The processor 102 may determine the certain display location of the secondary display 204 from the information about the secondary display 204 received from the secondary display 204. For instance, the processor 102 may determine the certain display location of the secondary display 204 from the resolution and/or the physical size of the secondary display 204 identified in the information received from the secondary display 204. The certain display location may be the central display location of the secondary display 204.

In other examples, the icon 300 may be positioned at a location of the secondary display 204 other than the central display location of the secondary display 204. For instance, the processor 102 may determine another location of the secondary display 204 at which the icon 300 may be displayed. As the processor 102 may know the location at which the icon 300 is displayed, the processor 102 may determine the position of the secondary display 204 with respect to the primary display 200 as discussed herein. In some examples, the processor 102 may cause a plurality of icons 300 to be displayed at certain locations on the secondary display 204. In these examples, the processor 102 may track movements of the cursor 302 to the plurality of icons 300 and may determine the position of the secondary display 204 with respect to the primary display 200 based on the tracked movements.

In some examples, the icon 300, which may also be termed a button or other type of selectable displayed element, may include text to instruct a user to select the icon 300. For instance, the icon 300 may include text, such as "Select Here," "Press Here," or the like.

According to examples, and as shown in FIG. 3B, the processor 102 may cause the window 210 to display options 304, 306 for the user to select whether the secondary display 204 is to duplicate the primary display 200 or to extend the display of the primary display 200. Images displayed on the primary display 200 may be duplicated on the secondary display 204 when the duplicate display option 304 is selected. The secondary display 204 may extend the display of the primary display 200, e.g., different, but contiguous desktop screens may be displayed on the primary display 200 and the secondary display 204, when the extend display option 306 is selected. In contrast, the secondary display 204 may mirror or copy the desktop screen displayed on the primary display 200, when the duplicate or mirror option is selected. In addition, the processor 102 may cause the icon 300 to be displayed on the secondary display 204 in response to a detection that the secondary display 204 is to extend the display of the primary display 200. However, the processor 102 may cancel the location detection operation of the secondary display 204 in response to a detection that the secondary display 204 is to duplicate the display of the primary display 200. In this instance, the processor 102 may not cause the icon 300 to be displayed on the secondary display 204.

In instances in which the processor is to continue with the location detection operation of the secondary display 204, the processor 102 may cause representations 310, 312 of the primary display 200 and the secondary display 204 to be displayed on the primary display 200. An example of a window 210 in which the representations 310, 312 of the primary display 200 and the secondary display 204 are displayed is depicted in FIG. 3C. FIG. 3C also depicts a representation 314 of the icon 300 and a representation 316 of a cursor 302. In some examples, the processor 102 may cause an animation of the cursor 302 moving from the representation 310 of the primary display 200 to the representation 314 of the icon 300 displayed on the representation 312 of the secondary display 204 to instruct the user to move the cursor 302 displayed on the primary display 200 to the icon 300 displayed on the secondary display 204. The animation is represented by the dotted line 318, which may be repeated a number of times, e.g., until the user moves the cursor 302 and selects the icon 300.

The user may move the cursor 302 from a current position on the primary display 200 to the icon 300 displayed on the secondary display 204. The user may move the cursor 302 through use of an input device 214, which may be a mouse, a trackpad, a roller, a pen, a microphone (e.g., through voice commands), and/or the like. In addition, the processor 102 may execute the instructions 116 to track a movement of the cursor 302 from the primary display 200 to the icon 300 displayed on the secondary display 204. For instance, when the user selected to continue with the location detection operation of the secondary display 204, the cursor 302 may be displayed on the primary display 200. In addition, the user may move the cursor 302 from the primary display 200 to the icon 300 displayed on the secondary display 204. As discussed in greater detail below, the processor 102 may track the angle at which the cursor 302 moved from when the cursor 302 moved from the primary display 200 to the secondary display 204 toward the icon 300.

The processor 102 may execute the instructions 118 to determine a position of the secondary display 204 with respect to the primary display 200 based on the tracked movement of the cursor 302. That is, for instance, the processor 102 may determine the location of the center of the secondary display 204 with respect to the primary display 200 based on the angle at which the cursor 302 moved from an edge of the primary display 200 to the icon 300 displayed on the secondary display 204. The processor 102 may determine when the cursor 302 is positioned over the icon 300 and/or when a user selects or clicks on the icon 300.

As shown in FIG. 3D, the processor 102 may track the movement of the cursor 302 as the cursor 302 is moved from the primary display 200 to the secondary display 204. The movement of the cursor 302 from the window 210 displayed on the primary display 200 to the icon 300 displayed on the secondary display 204 is denoted by the dotted line 320. Although the line 320 is depicted as being straight, the user may have moved the cursor 302 from a location at an edge 322 of the primary display 200 to the icon 300 that does not follow the straight line 320. The processor 102 may thus determine the location at the edge 322 of the primary display 200 at which the cursor 302 was moved out of the primary display 200 and the horizontal and vertical movements 324, 326 of the cursor 302 from the edge 322 to the icon 300. The processor 102 may determine the vertical position of the icon 300, e.g., the certain display location, of the secondary display 204 with respect to the edge location 322 on the primary display 200. In some examples, the processor 102 may determine an angle 328 at which the icon 300 is positioned from the edge location 322 with respect to a horizontal axis and may determine the vertical position of the secondary display 204 with respect to the edge location 322 from the determined angle 328. In addition, the processor 102 may calibrate the position of the secondary display 204 with respect to the primary display 200 based on the determined vertical distance 326 and/or the determined angle 328.

The processor 102 may execute the instructions 120 to store the determined position of the secondary display 204 with respect to the primary display 200. Particularly, the processor 102 may determine the location of the secondary display 204 with respect to the primary display 200 based on the direction in which the cursor 302 moved and the determined vertical distance of the icon 300 with respect to the edge location 322. The processor 102 may store the determined position (position information 216) of the secondary display 204 with respect to the primary display 200 in the data store 106. The position information 216 may include both the horizontal position and the vertical position of the secondary display 204 with respect to the primary display 200. In addition, the processor 102 may use the determined position of the secondary display 204 with respect to the primary display 200 to accurately use the secondary display 204 as an extended display of the primary display 200.

In some examples, the processor 102 may display representations 310, 312 of the primary display 200 and the secondary display 204 as shown in FIG. 3E. The representation 312 of the secondary display 204 may be positioned at a location with respect to the primary display 200 that corresponds to the determined position of the secondary display 204 with respect to the primary display 200. The processor 102 may also display an option 330 for the user to confirm that the determined position of the secondary display 204 with respect to the primary display 200 as shown in the window 210 is correct. In instances in which the user selects the option 330 to confirm that the determined position of the secondary display 204 with respect to the primary display 200 is correct, the processor 102 may store the determined position of the secondary display 204. However, in instances in which the user does not confirm that the determined position is correct, the user may move the representation 312 of the secondary display 204 in the window 210 to another position. The user may also move the representation 312 of the secondary display 204 if, for instance, the user moves the secondary display 204 to another position with respect to the primary display 200. In any of these instances, the processor 102 may store the position of the secondary display 204 to correspond to the position of the representation 312 of the secondary display 204 as shown in the window 210.

In some instances, the user may set up multiple secondary displays 204, 340 with respect to the primary display 200. An example of the primary display 200 with multiple secondary displays 204, 340 is shown in FIG. 3F. Particularly, a secondary display 204 and a tertiary display 340 may be positioned adjacent to a primary display 200. In these instances, the processor 102 may determine the locations of both the secondary display 204 and the tertiary display 340 with respect to the primary display 200. In some examples, the processor 102 may determine the locations of both the secondary display 204 and the tertiary display 340 based on a movement of the cursor 302 from the primary display 200, through the secondary display 204 and to an icon 342 displayed on the tertiary display 340. That is, the processor 102 may determine the locations of both the secondary display 204 and the tertiary display 340 without causing the icon 300 to be displayed on the secondary display 204.

In these examples, the processor 102 may cause the icon 342 to be displayed at a certain location on the tertiary display 340 and the processor 102 may track the movement of the cursor 302 from the primary display 200, through the secondary display 204, and to the icon 342 displayed on the tertiary display 340. with respect to the primary display 200. The processor 102 may also cause a video or another set of instructional images to be displayed on the primary display 200 to instruct the user to move the cursor 302 from the primary display 200 to the icon 342 displayed on the tertiary display 340. In any regard, the processor 102 may determine the location, e.g., the horizontal direction and vertical distance, of the tertiary display 340 with respect to the primary display 200 based on the cursor 302 movement. In addition, the processor 102 may determine the horizontal direction and may infer the vertical distance of the secondary display 204 with respect to the primary display 200 and the tertiary display 340 based on the movement of the cursor 302 through the secondary display 204.

In other examples, the processor 102 may determine the locations of the secondary display 204 and the tertiary display 340 in two separate operations. That is, the processor 102 may cause the icon 300 to be displayed on the secondary display 204 and the icon 342 to be displayed on the tertiary display 340. In these examples, the processor 102 may track movement of the cursor 302 from the primary display 200 to the icon 300 and may determine the location of the secondary display 204 with respect to the primary display 200 based on the tracked movement. The processor 102 may also track movement of the cursor 302 from the primary display 200 (or the icon 300 displayed on the secondary display 204) to the icon 342 displayed on the tertiary display 340. The processor may determine the location of the tertiary display 340 with respect to the primary display 200 (and/or the secondary display 204) from the tracked movement. The processor 102 may perform this technique to determine the locations of the secondary display 204 and the tertiary display 340 in instances in which the primary display 200 is positioned between the secondary display 204 and the tertiary display 340.

The processor 102 may determine locations of any additional displays in similar manners to any of the manners discussed above.

Although the instructions 110-120 are described herein as being stored on the memory 104 and may thus include a set of machine-readable instructions, the apparatus 100 may include hardware logic blocks that may perform functions similar to the instructions 110-120. For instance, the processor 102 may include hardware components that may execute the instructions 110-120. In other examples, the apparatus 100 may include a combination of instructions and hardware logic blocks to implement or execute functions corresponding to the instructions 110-120. In any of these examples, the processor 102 may implement the hardware logic blocks and/or execute the instructions 110-120. As discussed herein, the apparatus 100 may include additional instructions and/or hardware logic blocks such that the processor 102 may execute operations in addition to or in place of those discussed above with respect to FIG. 1.

Figure 4:
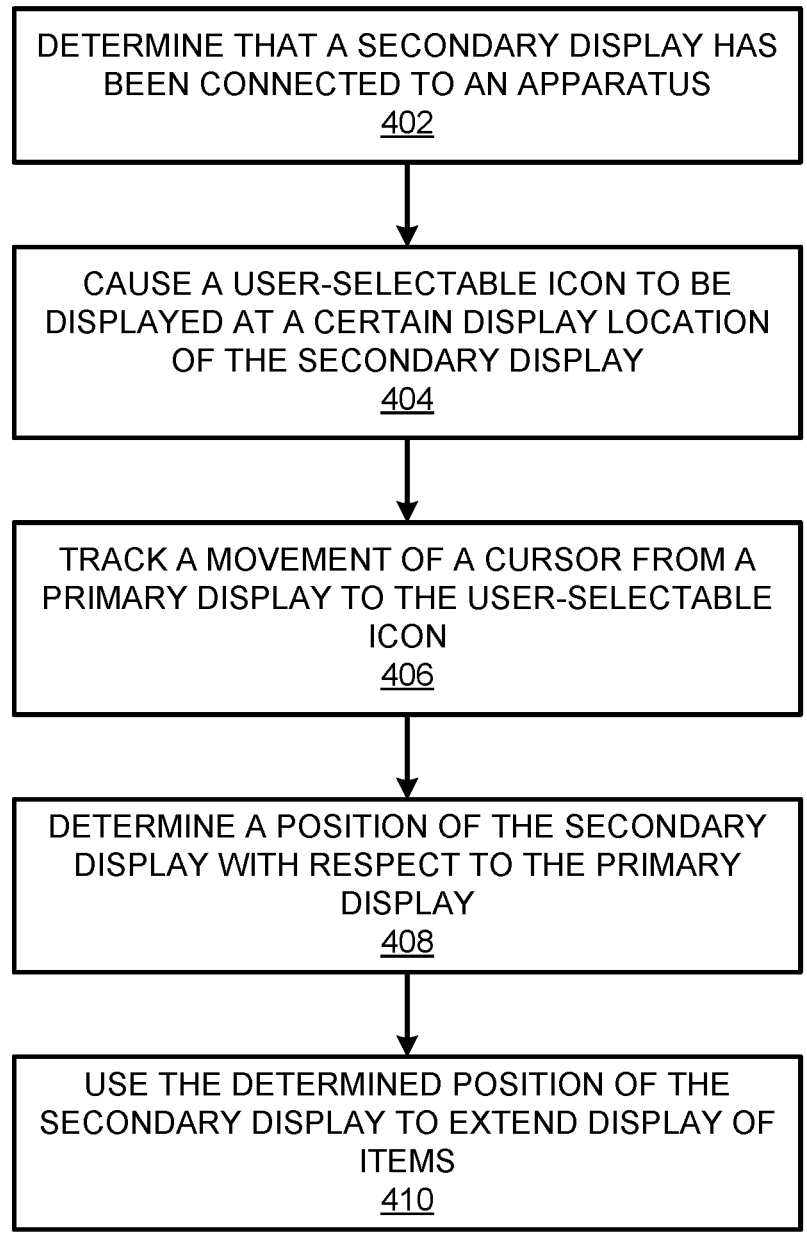
FIG. 4 depicts a flow diagram of a method for determining a position of a secondary display with respect to a primary display and for using the determined position to extend a display of images between the primary display and the secondary display, in accordance with an embodiment of the present disclosure.

Various manners in which the processor 102 of the apparatus 100 may operate are discussed in greater detail with respect to the method 400 depicted in FIG. 4. Particularly, FIG. 4 depicts a flow diagram of a method 400 for determining a position of a secondary display 204 with respect to a primary display 200 and for using the determined position to extend a display of images between the primary display 200 and the secondary display 204, in accordance with an embodiment of the present disclosure. It should be understood that the method 400 may include additional operations and that some of the operations described therein may be removed and/or modified without departing from the scope of the method 400. The description of the method 400 is made with reference to the features depicted in FIGS. 1-3F for purposes of illustration.

At block 402, the processor 102 may determine that a secondary display 204 has been connected to an apparatus 100. As discussed herein, the processor 102 may be a processor of the apparatus 100. The processor 102 may also determine that the secondary display 204 has been connected to the apparatus 100 for the first time as also discussed herein.

At block 404, the processor 102 may cause an icon 300 to be displayed at a certain display location of the secondary display 204. As discussed herein, the processor 102 may receive information from the secondary display 204 and may determine properties of the secondary display 204 from the received information. The processor 102 may further determine the certain display location of the secondary display 204 from the determined properties of the secondary display 204, such as, a resolution of the secondary display 204, physical dimensions of the secondary display 204, etc.

In some examples, responsive to the determination that the secondary display 204 has been connected to the apparatus 100, the processor 102 may cause a window 210 including an option 212 for a user to proceed with a location detection operation of the secondary display 204 to be displayed on the primary display 200. The processor 102 may also cause the icon 300 to be displayed at the certain display location of the secondary display 204 in response to receipt of an instruction to proceed with the location detection operation of the secondary display 204.

In some examples, the processor 102 may cause the window 210 to display an option 304, 306 for the user to select whether the secondary display 204 is to duplicate the primary display 200 or to extend a display of the primary display 200. The processor 102 may cause the icon 300 to be displayed at the certain display location of the secondary display 204 in response to a detection that the secondary display 204 is to extend the display of the primary display 200. However, the processor 102 may cancel the location detection operation of the secondary display 204 in response to a detection that the secondary display 204 is to duplicate the display of the primary display 200. In addition, the processor 102 may duplicate, e.g., mirror, the display of the primary display 200 on the secondary display 204.

In response to a determination that the location detection operation is to proceed, the processor 102 may cause representations 310, 312 of the primary display 200 and the secondary display 204 to be displayed on the primary display 200. The processor 102 may also cause an animation of a representation of a cursor 316 moving from the representation 310 of the primary display 200 to a representation 314 of an icon displayed on the representation 312 of the secondary display 204 to instruct the user to move the cursor 302 displayed on the primary display 200 to the icon 300 displayed on the secondary display 204.

At block 406, the processor 102 may track a movement of a cursor 302 from the primary display 200 to the icon 300 displayed at the certain display location of the secondary display 204. In some examples, the processor 102 may track a horizontal distance 324, a vertical distance 326, and/or an angle from where the cursor 302 moved from the primary display 200 to the secondary display 204 to the icon 300 displayed on the secondary display 204.

At block 408, the processor 102 may determine a position of the secondary display 204 with respect to the primary display 200 based on the tracked movement of the cursor 302. For instance, the processor 102 may calibrate the position of the secondary display 204 with respect to the primary display 200 based on the tracked horizontal distance 324, vertical distance 326, and/or angle 328.

At block 410, the processor 102 may use the determined position of the secondary display with respect to the primary display to extend a display of images between the primary display 200 and the secondary display 204. This may include storing of the position information 216 in the data store 106. In some examples, the processor 102 may display representations 310, 312 of the primary display 200 and the secondary display 204, in which the representation 312 of the secondary display 204 is positioned at a location with respect to the representation 310 of the primary display 200 that corresponds to the determined position of the secondary display 204 with respect to the primary display 200. In addition, the processor 102 may display an option 330 for the user to confirm that the determined position of the secondary display 204 with respect to the primary display 200 is correct.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
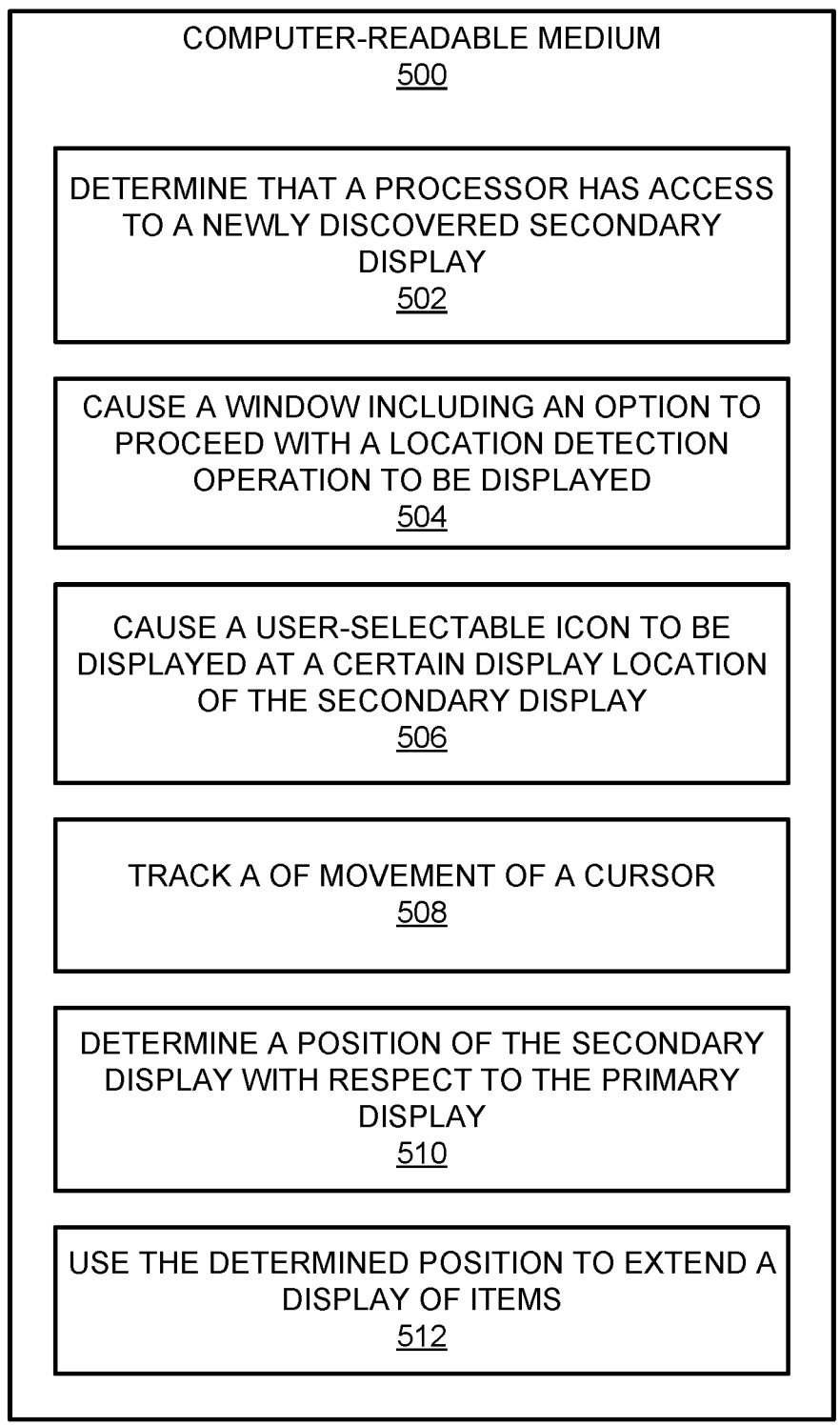
FIG. 5 shows a block diagram of a computer-readable medium that may have stored thereon computer-readable instructions for determining a position of a secondary display with respect to primary display based on a tracked movement of a cursor from the primary display to an icon displayed at a certain display location of the secondary display, in accordance with an embodiment of the present disclosure.

Turning now to FIG. 5, there is shown a block diagram of a computer-readable medium 500 that may have stored thereon computer-readable instructions for determining a position of a secondary display 204 with respect to a primary display 200 based on a tracked movement of a cursor 302 from the primary display 200 to an icon 300 displayed at a certain display location of the secondary display 204, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-512 that a processor, such as the processor 102 of the apparatus 100 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to determine that the processor has access to a newly discovered secondary display 204. The processor may fetch, decode, and execute the instructions 504 to cause a window 210 including an option 212 to proceed with a location detection operation of the secondary display 204 to be displayed on a primary display 200. The processor may fetch, decode, and execute the instructions 506 to cause an icon 300 to be displayed at a certain display location of the secondary display 204 in response to a determination that the location detection operation of the secondary display 204 is to continue, the processor may cause the window 210 to display an option 304, 306 for a selection of whether the secondary display 204 is to duplicate the primary display 200 or to extend a display of the primary display 200. In addition, the processor may cause the icon 300 to be displayed at the certain display location of the secondary display 204 in response to a detection that the secondary display 204 is to extend the display of the primary display 200. Alternatively, the processor may cancel the location detection operation of the secondary display 204 in response to a detection that the secondary display 204 or another display (not shown) is to duplicate, e.g., mirror, the primary display 200.

In some examples, in response to a determination that the location detection operation is to proceed, the processor may cause representations 310, 312 of the primary display 200 and the secondary display 204 to be displayed on the primary display 200. The processor may also cause an animation of a cursor 316 moving from the representation 310 of the primary display 200 to a representation 314 of an icon displayed on the representation 312 of the secondary display 204 to instruct the user to move the cursor 302 displayed on the primary display 200 to the icon 300 displayed on the secondary display 204.

The processor may fetch, decode, and execute the instructions 508 to track a movement of a cursor 302 from the primary display 200 to the icon 300 displayed at the certain display location of the secondary display 204. For instance, the processor may track both a vertical distance 326 and a horizontal distance 324 from where the cursor 302 moved from the primary display 200 to the secondary display 204 to the icon 300 displayed on the secondary display 204. The processor may also calibrate the position of the secondary display 204 with respect to the primary display 200 based on the tracked movement.

The processor may fetch, decode, and execute the instructions 510 to determine a position of the secondary display 204 with respect to the primary display 200 based on the tracked movement of the cursor 302. The processor may fetch, decode, and execute the instructions 512 to use the determined position of the secondary display 204 with respect to the primary display 200 to extend a display of images between the primary display 200 and the secondary display 204.

In some examples, the processor may provide a user interface that may present a post-configuration to the user in which the user is able to fine tune or augment the configuration of the displays 200, 204. The user interface may show how the displays 200, 204 intersect each other at their edges and other potential post configuration signals. The user interface may, for instance, display representations of the displays 200, 204 that correspond to the logical sizes, e.g., pixels, of the displays 200, 204. By way of example, the processor may cause a tall and thin rectangle to graphically represent a logically larger secondary display 204 and allowing the user to move that rectangle vertically to fine tune the vertical alignment of the secondary display 204 in a way that conveys the logical vs physical nature of the relationship between the primary display 200 and the secondary display 204.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   responsive to a determination that a secondary display is connected to the apparatus, cause a primary display of the apparatus to display a window including an option button to be selected to proceed with a location detection operation of the secondary display;
   in response to a selection of the option button to proceed with the location detection operation of the secondary display, cause the second display to display an icon on the secondary display;
   track a movement of a cursor from a location on the primary display to the icon displayed on the secondary display, including determining an angle of the cursor moving from the primary display to the icon displayed on the secondary display;
   determine a position of the secondary display with respect to the primary display based on the tracked movement, including the determined angle, of the cursor; and
   store the determined position of the secondary display with respect to the primary display.

2. The apparatus of claim 1, wherein the instructions cause the processor to:
   determine that the secondary display is connected to the apparatus for a first time; and
   in response to the determination that the secondary display is connected to the apparatus for the first time, cause the primary display to display the window including the option button to proceed with the location detection operation of the secondary display.

3. The apparatus of claim 1, wherein the instructions cause the processor to:
   receive information from the secondary display;
   determine properties of the secondary display from the received information;
   determine a certain display location of the secondary display from the determined properties of the secondary display; and
   cause the icon to be displayed at the certain display location of the secondary display.

4. The apparatus of claim 1, wherein the instructions cause the processor to:
   in response to the selection of the option button to proceed with the location detection operation of the secondary display, cause the window to display an option to be selected whether the secondary display is to duplicate the primary display or to extend a display of the primary display; and
   in response to a selection of the option for the secondary display to extend the display of the primary display, determine that the location detection operation of the secondary display is to proceed.

5. The apparatus of claim 4, wherein the instructions cause the processor to:
in response to a selection of the option for the secondary display to duplicate the display on the primary display, cancel the location detection operation of the secondary display.

6. The apparatus of claim 4, wherein the instructions cause the processor to:
in response to a determination that the location detection operation of the secondary display is to proceed, cause the primary display to display representations of the primary display and the secondary display; and
cause an animation of the cursor moving from the representation of the primary display to an icon displayed on the representation of the secondary display to instruct a user to move the cursor displayed on the primary display to the icon displayed on the secondary display.

7. The apparatus of claim 1, wherein the instructions cause the processor to:
cause the primary display to display representations of the primary display and the secondary display, wherein the representation of the secondary display is positioned at a location with respect to the representation of the primary display that corresponds to the determined position of the secondary display with respect to the primary display; and
display an option for a user to confirm that the determined position of the secondary display with respect to the primary display is correct.

8. The apparatus of claim 1, wherein the instructions cause the processor to:
cause an icon to be displayed on a tertiary display;
track a movement of the cursor from at least one of the primary display and the secondary display to the icon displayed on the tertiary display;
determine a position of the tertiary display with respect to the primary display and the secondary display based on the tracked movement of the cursor from at least one of the primary display and the secondary display to the icon displayed on the tertiary display; and
store the determined position of the tertiary display with respect to the primary display and the secondary display.

9. A method comprising:
responsive to a determination that a secondary display is connected to an apparatus, causing, by a processor, a primary display of the apparatus to display a window including an option button to be selected to proceed with a location detection operation of the secondary display;
causing, by the processor, the secondary display to display an icon on the secondary display;
tracking, by the processor, a movement of a cursor from a location on the primary display to the icon displayed on the secondary display, including determining an angle of the movement of the cursor from the primary display to the icon displayed on the secondary display;
determining, by the processor, a position of the secondary display with respect to the primary display based on the tracked movement, including the determined angle, of the cursor; and
storing, by the processor, the determined position of the secondary display with respect to the primary display.

10. The method of claim 9, further comprising:
using, by the processor, the determined position of the secondary display with respect to the primary display to extend a display of images between the primary display and the secondary display.

11. The method of claim 9, further comprising:
in response to the selection of the option button to proceed with the location detection operation of the secondary display, causing the window on the primary display to display an option to be selected whether the secondary display is to duplicate the primary display or to extend a display of the primary display; and
in response to a selection of the option for the secondary display to extend the display of the primary display, determining that the location detection operation of the secondary display is to proceed; or
in response to a selection of the option for the secondary display to duplicate the display on the primary display, canceling the location detection operation of the secondary display.

12. The method of claim 11, further comprising:
in response to a determination that the location detection operation is to proceed, causing the primary display to display representations of the primary display and the secondary display; and
causing an animation of the cursor moving from the representation of the primary display to an icon displayed on the representation of the secondary display to instruct a user to move the cursor displayed on the primary display to the icon displayed on the secondary display.

13. The method of claim 9, further comprising:
receiving information from the secondary display;
determining properties of the secondary display from the received information;
determining a certain display location of the secondary display from the determined properties of the secondary display; and
causing the icon to be displayed at the certain display location of the secondary display.

14. The method of claim 9, further comprising:
causing the primary display to display representations of the primary display and the secondary display, wherein the representation of the secondary display is positioned at a location with respect to the representation of the primary display that corresponds to the determined position of the secondary display with respect to the primary display; and
displaying an option for a user to confirm that the determined position of the secondary display with respect to the primary display is correct.

15. The method of claim 9, further comprising:
causing an icon to be displayed on a tertiary display;
tracking a movement of the cursor from at least one of the primary display and the secondary display to the icon displayed on the tertiary display;
determining a position of the tertiary display with respect to the primary display and the secondary display based on the tracked movement of the cursor from at least one of the primary display and the secondary display to the icon displayed on the tertiary display; and
storing the determined position of the tertiary display with respect to the primary display and the secondary display.

16. A non-transitory computer-readable medium on which is stored computer-readable instructions that when executed by a processor, cause the processor to:

responsive to a determination that a secondary display is connected to an apparatus, cause a primary display of the apparatus to display a window including an option button to be selected to proceed with a location detection operation of the secondary display;

in response to a selection of the option button to proceed with the location detection operation of the secondary display, cause the second display to display an icon on the secondary display;

track a movement of a cursor from a location on the primary display to the icon displayed on the secondary display, including determining an angle of the cursor moving from the primary display to the icon displayed on the secondary display;

determine a position of the secondary display with respect to the primary display based on the tracked movement, including the determined angle, of the cursor; and store the determined position of the secondary display with respect to the primary display.

17. The non-transitory computer-readable medium of claim 16, wherein the instructions further cause the processor to:

cause the window to display an option for a selection of whether the secondary display is to duplicate the primary display or to extend a display of the primary display;

in response to a selection of the option for the secondary display to extend the display of the primary display, determine that the location detection operation of the secondary display is to proceed; or in response to a selection of the option for the secondary display to duplicate the display on the primary display, cancel the location detection operation of the secondary display.

18. The non-transitory computer-readable medium of claim 17, wherein the instructions further cause the processor to:

in response to a determination that the location detection operation is to proceed, cause the primary display to display representations of the primary display and the secondary display; and cause an animation of the cursor moving from the representation of the primary display to an icon displayed on the representation of the secondary display to instruct a user to move the cursor displayed on the primary display to the icon displayed on the secondary display.

19. The non-transitory computer-readable medium of claim 16, wherein the instructions further cause the processor to:

cause the primary display to display representations of the primary display and the secondary display, wherein the representation of the secondary display is positioned at a location with respect to the representation of the primary display that corresponds to the determined position of the secondary display with respect to the primary display; and display an option for a user to confirm that the determined position of the secondary display with respect to the primary display is correct.

20. The non-transitory computer-readable medium of claim 16, wherein the instructions further cause the processor to:

cause an icon to be displayed on a tertiary display;

track a movement of the cursor from at least one of the primary display and the secondary display to the icon displayed on the tertiary display;

determine a position of the tertiary display with respect to the primary display and the secondary display based on the tracked movement of the cursor from at least one of the primary display and the secondary display to the icon displayed on the tertiary display; and store the determined position of the tertiary display with respect to the primary display and the secondary display.

* * * * *